United States Patent

Neidl

[11] 4,092,541
[45] May 30, 1978

[54] METHOD FOR DETERMINING THE ACTIVITY CONCENTRATION IN WASTE GASES FOR SPECIFIC NUCLIDES

[75] Inventor: Herbert Neidl, Erlangen, Germany

[73] Assignee: Kraftwerk Union Aktiengesellschaft, Mulheim (Rhur), Germany

[21] Appl. No.: 713,871

[22] Filed: Aug. 12, 1976

[30] Foreign Application Priority Data

Aug. 19, 1975 Germany .............................. 2536897

[51] Int. Cl.² .................................................. G01T 1/20
[52] U.S. Cl. ..................................... 250/364; 250/380; 176/19 LD
[58] Field of Search ............................... 250/364, 380; 176/19 LD

[56] References Cited

U.S. PATENT DOCUMENTS

| | | | |
|---|---|---|---|
| 2,599,922 | 6/1952 | Kanne | 250/380 |
| 3,084,251 | 4/1963 | Goupil | 250/364 |
| 3,458,701 | 7/1969 | Schell | 250/364 |
| 3,531,639 | 9/1970 | Baum | 250/364 |

Primary Examiner—Harold A. Dixon
Attorney, Agent, or Firm—Herbert L. Lerner

[57] ABSTRACT

Method of determining the activity concentration of the radio nuclides in waste gases of nuclear power plants by bleeding a part of the gas stream, compressing it to a high superatmospheric pressure, passing the compressed gas into a high pressure chamber where the specific nuclides are measured by means of a calibrated Ge (Li) detector, and returning the gas from the chamber at reduced pressure to the gas stream. The activity concentration of the gas in the high-pressure vessel permits measurement of the specific nuclides, and also permits detection of waste gas activities which are below the customary detection limits.

6 Claims, 1 Drawing Figure

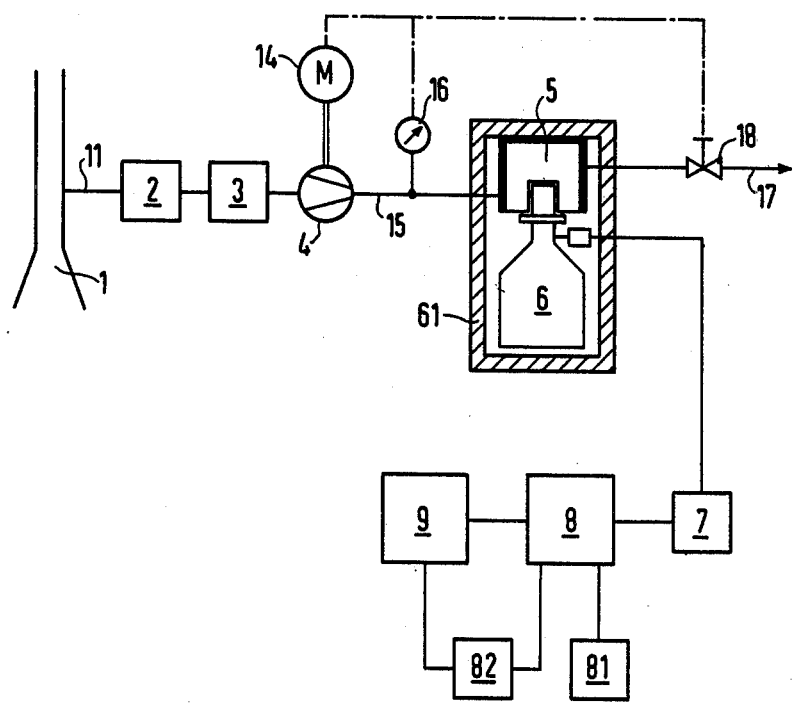

METHOD FOR DETERMINING THE ACTIVITY CONCENTRATION IN WASTE GASES FOR SPECIFIC NUCLIDES

BACKGROUND OF THE INVENTION

1. Field of the Invention

The present invention relates to monitoring the release of radio nuclides contained in gas streams, and more particularly, refers to a new and improved method of obtaining the activity concentration for specific nuclides in waste gases of nuclear installations, by means of high-resolution gamma spectroscopy.

2. Description of the Prior Art

In the operation of nuclear installations, radioactive gases, particularly rare gases, are released into the open air. These releases must be monitored reliably, so that the permissible upper limit, which is set for safety reasons, is not exceeded. Customarely, this monitoring is accomplished by measurement of the $\beta$-activity in the stack exhaust air as the sum of the individual components, i.e., without regard to the activity concentration of individual nuclides in the gas mixture.

Since, however, the individual nuclides differ greatly from each other as to their radio toxicity, the maximally permissible emission rates could be utilized optimally if the shares of the individual nuclides in the gas mixture were known. The permissible emission rates are composed of emitted curie/unit of time or Ci/t multiplied by a loading factor specific for each nuclide as illustrated in table I. The actual impact on the environment can therefore be determined only if the emission shares of individual nuclides are known.

SUMMARY OF THE INVENTION

An object of the present invention is to provide a method of monitoring the waste gases of nuclear installations to obtain information regarding the activity concentration for specific radio nuclides contained in the gas stream.

With the foregoing and other objects in view, there is provided in accordance with the invention a method for determining the activity concentration of the radio nuclides contained in gas streams, particularly in waste gases of nuclear power plants, by means of gamma spectroscopy, the improvement includes bleeding part of the gas stream, compressing the gas stream to a high superatmospheric pressure, conducting the gas stream at a high superatmospheric pressure into a high-pressure vessel, measuring the gas in the high-pressure vessel in the state of highsuperatmospheric pressure for specific nuclides by means of a calibrated Ge(Li) detector, discharging the gas from the high-pressure vessel, and returning the discharged gas to the gas stream from which it was bled.

Calibration of the Ge(Li) detector may be effected by the following steps:

(a) Taking a certain volume of coolant from the reactor cooling loop of a nuclear reactor;
(b) determining the activity concentration of fission gases in this volume of coolant for specific nuclides;
(c) degassing this volume of coolant;
(d) transferring the amount of gas obtained by degassing into said high-pressure vessel;
(e) determining the activity concentration remaining in the coolant volume in comparison with b), whereby the activity concentration in the high-pressure vessel of the individual fission gas nuclides is obtained; and
(f) calibrating the measuring apparatus by means of the activity concentrations known from e).

BRIEF DESCRIPTION OF THE DRAWING

Other features which are considered as characteristic for the invention are set forth in the appended claims.

Although the invention is illustrated and described herein as embodied in method for determining the activity concentration in waste gases for specific nuclides, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing, which diagrammatically illustrates one method of carrying out the present invention.

DETAILED DESCRIPTION OF THE INVENTION

In accordance with the invention, part of the gas stream is fed via a compressor, wherein it is compressed to high superatmospheric pressure, in excess of 50 bar, preferably in excess of 100 bar, and desirably between 100 to 300 bar, and the compressed gas then led to a high-pressure vessel. The gas at high superatmospheric pressure is measured there for specific nuclides by means of a Ge(Li) detector and pulse-processing electronic circuitry and is released from the high-pressure vessel through an appropriately set choke or valve constriction and returned to the gas stream. In order to prevent radioactive contamination in the high-pressure vessel, it is advisable to conduct the gas stream through an aerosol and an iodine filter before it enters the compressor. In this manner, it becomes possible not only to make measurements as to the specific nuclides, but also to detect waste gas activities which are below the customary detection limits.

To explain the method in further detail, reference is made to an example which is shown schematically in the figure. Gaseous effluents, designated waste gas, can be released to the atmosphere through a tall stack to obtain the necessary atmospheric dilution. The waste air stack, the gases of which are to be examined, is designated by numeral 1. A gas sampling line 11 is connected to waste air stack 1 to bleed a sample of the gas passing up the stack 1. Radioactive contamination of the high-pressure vessel 5 is prevented by first passing the gas flowing through sampling line 11 through known or conventional filters, namely, an aerosol filter 2, then to an iodine filter 3. The filtered gas is then compressed to a high superatmospheric pressure of 200 bar by a compressor 4 driven by a motor 14. A high-pressure line 15 for conducting the compressed gas leads from the compressor 4 to the high-pressure vessel 5. A pressure-indicating instrument is connected to line 15 and provided with limit-switch 16 connected to motor 14 to cut off the power in the event the pressure exceeds a predetermined point. Gases are discharged from the high-pressure vessel 5 through a connected exhaust gas line 17. The gases then pass through a choke with a magnetic valve 18 in line 17 and are returned to stack 1 where they are released with the main stream of gases to the atmosphere. A Ge/Li detector 6 of known or conventional design to determine radiation is mounted on high pressure vessel 5, and both are enclosed by a gamma-radiation shield 61. The measurement data of the detector 6 is fed to an amplifier 7 and from there to a pulse amplitude analyzer 8, which in turn is connected to a computer 9 and a digital readout 82. The amplifier 7, analyzer 8, computer 9, and digital readout 82 are known or conventional equipment. An analog readout 81 of known or conventional design, on the picture screen and recorder of which the composition of the rare gas nuclides determined is directly visible, is connected to the pulse amplitude analyzer 8.

The motor 14, the pressure-indicating instrument with limit switches 16 and the choke with the magnetic valve 18 are connected as shown in the drawing by a dash-dotted line, i.e., these devices are connected to each other in a control sense for maintaining a constant pressure in the high-pressure vessel 5 during measurement of radiation. This arrangement insures that the waste gas to be monitored flows through the high-pressure vessel but that a high and constant pressure, i.e., 200 bar, is maintained in the latter for measurement purposes. High-pressure vessel 5 has a volumetric capacity of 2000 cc. Moreover, this arrangement insures that the gas stream is continuously fed into said high-pressure vessel and continuously discharged from said high-pressure vessel, whereby a state of high superatmospheric pressure is continously maintained in said high-pressure vessel. The activity concentration to be expected at this pressure is then 200 times higher than that at normal air pressure such as practically prevails in the waste air stack 1.

The sensitivity of the activity determination now depends on the response probability of the detector, the correlation with the high-pressure vessel 5 and on the material and wall thickness of the latter. As shown schematically in the figure, it is advisable that the high-pressure vessel 5 surround the detector head in hat-fashion to enable the largest possible radiating gas volume to be picked up by the detector 6. The high-pressure vessel 5 is advantageously made of a material as permeable as possible for gamma radiation, such as, for example, aluminum; but other materials such as, alloy steel, can also be employed.

For the practical evaluation of the pulse rates of the individual $\gamma$-lines determined in this method, it is necessary to calibrate the entire arrangement. As not all radioactive gases are commercially available, and particularly not those with a short half-life, it is advantageous to take them from the coolant of a nuclear reactor. For this purpose, the activity concentration of the individual nuclides is first measured in a given volume of water. This water volume is then degassed, preferably by passing $CO_2$ through it. The rare gases washed out in this process are collected in a vessel, together with $H_2$, $O_2$ and $N_2$. By again determining the activity concentration of the degassed water, the amount of difference of the activities is determined, which now corresponds to the activity contained in the collected gas volume. This gas volume is conducted into the high-pressure vessel and the measurement results obtained are calibrated by means of the above-mentioned difference activity. This method is especially well suited for calibration purposes, particularly in nuclear reactor installations, as the rare fission gases contained in the reactor coolant correspond in their composition to those given off the environment, dosed, via the waste air stack.

In the following table I are tabulated the nuclides, their corresponding half-life values, the gamma energy and the approximately attainable detection limits, based on a cubic meter of this gas under standard conditions of temperature and pressure, for the rare fission gases to be determined by this method. In addition, the corresponding gamma dose constants are given, as they, besides other criteria, provide the numerical basis for the radiological effectiveness of the individual nuclides.

TABLE I

| Nuclide | T ½ | $E_\gamma$ [MeV] | $E_\gamma$ [%]abs | Dose Constant $\gamma \frac{rem \cdot m^2}{Ci \cdot sec}$ | Detection Limit $[\frac{Ci}{Nm^3}]$ |
|---|---|---|---|---|---|
| $Xe^{133}$ | 5.29 days | 0.081 | 36.6 | $0.394 \cdot 10^{-5}$ | $6 \cdot 10^{-10}$ |
| $Xe^{135}$ | 9.14 hours | 0.250 | 92 | $3.72 \cdot 10^{-5}$ | $1 \cdot 10^{-10}$ |
| $Xe^{135m}$ | 15.6 min | 0.527 | 80 | $0.033 \cdot 10^{-5}$ | $2 \cdot 10^{-10}$ |
| $Xe^{138}$ | 17.5 min | 0.154 | 13.9 | $34 \cdot 10^{-5}$ | $4 \cdot 10^{-10}$ |
| | | 0.259 | 93 | | |
| | | 0.397 | 18.6 | | |
| | | 0.434 | 56.3 | | |
| | | 1.768 | 61.4 | | |
| | | 2.002 | 13 | | |
| | | 2.013 | 27 | | |
| $Kr^{85m}$ | 4.4 hours | 0.151 | 76.1 | $2.58 \cdot 10^{-5}$ | $2 \cdot 10^{-10}$ |
| | | 0.305 | 13.5 | | |
| $Kr^{87}$ | 76.4 min | 0.403 | 48.3 | $18 \cdot 10^{-5}$ | $4 \cdot 10^{-10}$ |
| | | 0.846 | 7.25 | | |
| $Kr^{88}$ | 2.8 hours | 0.166 | 6.8 | $22.2 \cdot 10^{-5}$ | $4 \cdot 10^{-10}$ |
| | | 0.196 | 38 | | |
| | | 0.835 | 13.1 | | |
| | | 1.530 | 11.5 | | |
| | | 2.39 | 35 | | |
| $Kr^{85}$ | 10.73 years | 0.514 | 0.43 | $0.033 \cdot 10^{-5}$ | $5 \cdot 10^{-8}$ |

Since only low activity values are involved, a time of about 10 to 20 minutes is required per measurement. The operation may be conducted so that the waste gas to be examined flows continuously through the high-pressure vessel during the measurement time by keeping choke valve 18 opened slightly to permit continuous flow of a restricted amount of gas therethrough and regulating compressor 4 to maintain the high superatmospheric pressure in high pressure vessel 5. Alternatively, choke valve 18 is closed until compressor 4 charges high-pressure vessel 5 with gas under high-superatmospheric pressure. Choke valve 18 is opened to discharge the measured gas from vessel 5 and then closed to permit recharge of vessel 5 with another portion of gas for measurement. The term "quasi-continuous" was chosen to characterize these methods, particularly since they serve to determine the activity values of the waste gases at definite, fixed short intervals.

There are claimed:

1. In a method for determining the activity concentration of the radionuclides contained in gas stream, particularly in waste gases of nuclear power plants, by means of gamma spectroscopy, the improvement comprising bleeding part of the gas stream, compressing said gas stream to a high superatmospheric pressure, conducting said gas stream at a high superatmospheric pressure into a high-pressure vessel, measuring said gas in said high-pressure vessel in the state of high superatmospheric pressure for specific nuclides by means of a calibrated Ge(Li) detector, wherein the activity concentrations of the individual nuclides are measured and evaluated by a pulse amplitude analyzer connected to said Ge(Li) detector as well as a computer connected to said pulse amplitude analyzer, and discharging said gas from said high-pressure vessel, and returning said discharge gas to the gas stream from which it was bled.

2. Method according to claim 1, wherein said gas stream flows through an aerosol and an iodine filter before compressing said gas stream.

3. Method according to claim 1, wherein said gas stream is continuously fed into said high-pressure vessel and continuously discharged from said high-pressure vessel, and a state of high superatmospheric pressure is continously maintained in said high-pressure vessel.

4. Method according to claim 1, wherein said gas stream is intermittantly fed into said high-pressure vessel without discharge of gas therefrom to provide gas in a state of high superatmospheric pressure in said high-pressure vessel for measurement, and the gas after measurement is discharged from said high-pressure vessel.

5. Method according to claim 1, wherein said gas in said high-pressure vessel for measuring is at a pressure of between about 100 to 300 bar.

6. In a method for determining the activity concentration of the radionuclides contained in gas stream, particularly in waste gases of nuclear power plants, by means of gamma spectroscopy, the improvement comprising bleeding part of the gas stream, compressing said gas stream to a high superatmospheric pressure, conducting said gas stream at a high superatmospheric pressure into a high-pressure vessel, measuring said gas in said high-pressure vessel in the state of high superatmospheric pressure for specific nuclides by means of a Ge(Li) detector calibrated by the following steps:

(a) taking a certain volume of coolant from the reactor cooling loop of a nuclear reactor;

(b) determining the activity concentration of fission gases in this volume of coolant for specific nuclides;

(c) degassing this volume of coolant;

(d) transferring the amount of gas obtained by degassing into said high-pressure vessel;

(e) determining the activity concentration remaining in the coolant volume in comparison with b), whereby the activity concentration in the high-pressure vessel of the individual fission gas nuclides is obtained; and (f) calibrating the measuring apparatus by means of the activity concentrations known from e), discharging said gas from said high-pressure vessel, and returning said discharged gas to the gas stream from which it was bled.

* * * * *